UNITED STATES PATENT OFFICE.

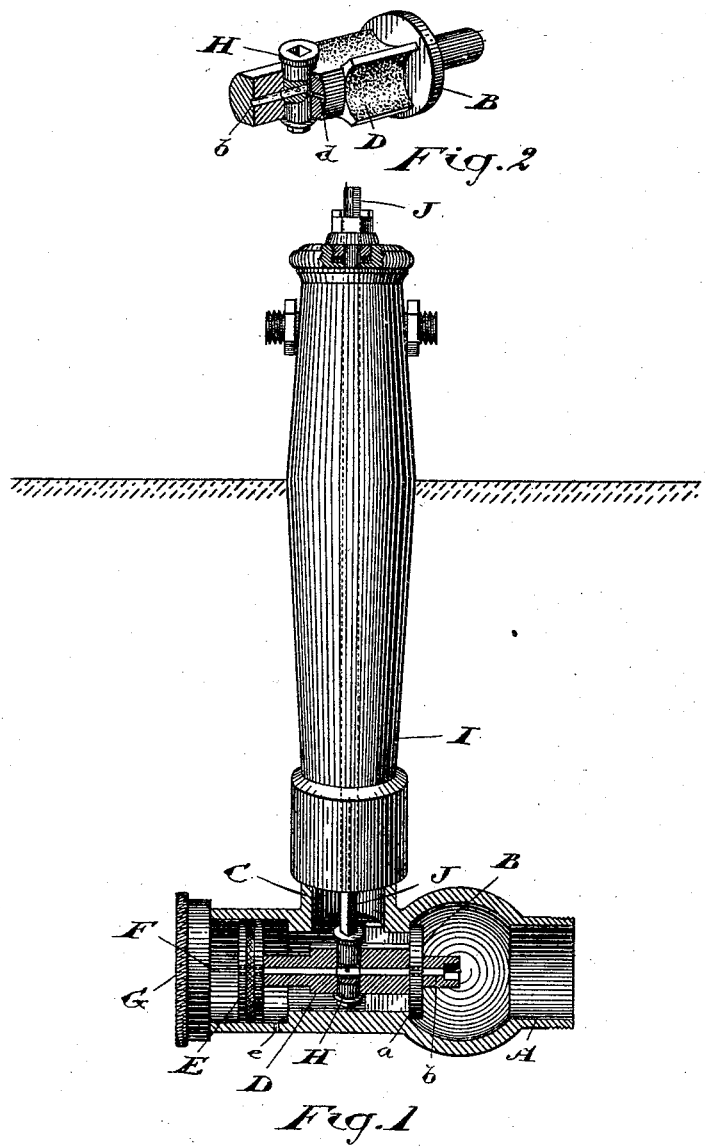

SAMUEL C. McNEILL, OF MONTREAL, ASSIGNOR OF ONE-HALF TO PETER CLARK, OF RICHMOND, CANADA.

CUT-OFF VALVE FOR HYDRANTS AND WATER-PIPES.

SPECIFICATION forming part of Letters Patent No. 496,580, dated May 2, 1893.

Application filed August 20, 1891. Serial No. 403,169. (No model.)

*To all whom it may concern:*

Be it known that I, SAMUEL CAMERON MCNEILL, of the city of Montreal, in the county of Hochelaga, in the Province of Quebec, Canada, have invented a certain new and Improved Cut-Off Valve for Hydrants and Water-Pipes, of which the following is a specification.

The object of the invention is to design a valve by which a large volume of water may be instantly turned on by the slight movement of a very small key, and which valve will close sufficiently slowly to prevent any undue jar upon the pipes, and it consists in the peculiar construction, arrangement and combinations of parts hereinafter more particularly described and then definitely claimed.

In the accompanying drawings—Figure 1, is a perspective view, partially in section showing my improved valve applied to a hydrant. Fig. 2 is a perspective view, partly in section, of the valve detached.

Although my valve has been specially invented for hydrants, it is equally applicable in all cases where it is necessary to control the discharge of water under pressure. For the purposes of this specification, it will be sufficient to show my valve as I have done as applied to a hydrant.

In the drawings, A, represents the small end of the valve chamber which connects with the water main.

B, is a valve fitted into the valve chamber, A, and designed to butt against the valve seat, *a*, on one side of the discharge port, C.

The valve spindle, D, extends across the discharge port, C, and has a piston, E, fixed to it, as indicated. This piston fits the larger end, F, of the valve chamber, which end is closed by a cap, G. A hole, *b*, is made through the valve spindle, D. A small cock, H, is inserted in the enlarged portion of the valve spindle, D, between the valve, B, and piston, E. This cock, H, has a small hole through it to correspond with the hole, *b*. When the cock, H, is turned so as to close the hole, *b*, the pressure of the water on the valve, B, holds it against its valve seat, *a*, thereby cutting off the water from the discharge port, C. By turning the cock, H, to bring its hole opposite to the hole, *b*, in the spindle, *d*, the water will flow through the said hole filling the chamber between the cap, G, and piston, E, and as this piston is larger in diameter than the valve, B, the pressure of the water against it will be correspondingly greater than the pressure against the valve, B. Consequently the said valve will be pushed off its seat, *a*, permitting the water to flow into the space between the valve, B, and piston, E, and thence through the discharge port, C. This port, C, as shown in the drawings, is connected to the hydrant, I, and the cock, H, is operated by a rod, J, which extends to the top of the hydrant as indicated. As the cock, H, is necessarily quite small, a very light rod, J, may be used, and consequently only a very small key or wrench is required in order to turn the cock, H, the quarter turn requisite to let on or cut off the water. When the water is cut off by the turning of the cock, H, a passage way, *d*, is opened between the holes, *b*, and the center portion of the valve chamber. This passage way permits the water behind the piston, E, to escape into the center portion of the valve chamber from which it escapes through the small hole, *e*. This hole also allows the water remaining in the hydrant to escape.

What I claim as my invention is—

The combination of the valve chamber having a combined piston and valve working horizontally therein, and having a passage *b* through it, and a second passage *d* at right angles thereto, with a cock set transversely in the stem of the piston and valve, and having apertures registering with passages *b* and *d*, and the means for operating said cock, substantially as described.

Toronto, July 9, 1891.

SAMUEL C. McNEILL.

In presence of—
I. EDW. MAYBEE,
W. G. McMILLAN.